United States Patent [19]

Karasik

[11] Patent Number: 5,694,678
[45] Date of Patent: Dec. 9, 1997

[54] UNIVERSAL WIRE HARNESS RETAINER CLIP HOLDING SYSTEM

[75] Inventor: Vladimir Karasik, Oak Park, Mich.

[73] Assignee: United Technologies Automotive Inc., Dearborn, Mich.

[21] Appl. No.: 603,396

[22] Filed: Feb. 20, 1996

Related U.S. Application Data

[62] Division of Ser. No. 340,588, Nov. 16, 1994, Pat. No. 5,535,511.

[51] Int. Cl.⁶ .............. B23P 19/04; B23Q 3/06; H01R 43/20; H01R 43/28
[52] U.S. Cl. .............. 29/721; 29/33 F; 29/33 M; 29/755; 29/760; 140/92.1; 269/66; 269/74; 269/903
[58] Field of Search .................. 29/33 F, 33 M, 29/755, 760, 709, 714, 721; 140/92.1, 71 R; 248/74.3; 269/66, 74, 75, 296, 310, 903; 901/47

[56] References Cited

U.S. PATENT DOCUMENTS

| | | | |
|---|---|---|---|
| 3,258,039 | 6/1966 | Ewalt | 29/755 X |
| 3,653,411 | 4/1972 | Mosher et al. | 29/760 X |
| 3,946,768 | 3/1976 | Fiorentino | 140/92.1 |
| 4,323,227 | 4/1982 | Turek | 269/903 X |
| 4,337,934 | 7/1982 | Caveney | 29/755 X |
| 4,566,502 | 1/1986 | Kellogg | 140/92.1 |
| 4,724,612 | 2/1988 | Pearson | 269/48.1 X |
| 4,867,207 | 9/1989 | Crawford | 29/755 X |
| 4,934,643 | 6/1990 | Militano, Jr. | 269/76 X |
| 4,965,929 | 10/1990 | Aligue | 29/755 X |
| 4,979,544 | 12/1990 | Swindlehurst | 140/92.1 |
| 5,168,904 | 12/1992 | Quinkert | 140/92.1 |
| 5,215,297 | 6/1993 | Sato et al. | 269/66 X |
| 5,478,060 | 12/1995 | Sugimoto et al. | 269/66 X |
| 5,490,664 | 2/1996 | Justus et al. | 269/74 X |

OTHER PUBLICATIONS

"Support Stand, Mounting and Cable Dressing Apparatus" Western Electric Technical Digest, No. 69, p. 1, Jan. 1983.

*Primary Examiner*—Peter Vo
*Attorney, Agent, or Firm*—Howard & Howard

[57] ABSTRACT

A family of retainer clip holders can each be adjusted to properly position a retainer clip at a desired location on a wire harness. In the past, it has sometimes been complicated to properly position a retainer clip holder relative to the base, and mount the holder base on a jig for assembling wire harnesses. There have typically been too many fixtures required on the jig. Thus, the prior art has attempted to assemble the retainer clips by individually tailoring hundreds of retainer clip holders for the particular orientation demanded by the particular retainer clip application. The inventive family of retainer clip holders allows the selection of the proper adjustable retainer clip holders and the adjustment of that retainer clip holder to accommodate the particular retainer clip application demanded. In this way, the invention replaces the hundreds of previously required holders with seven basic tools.

12 Claims, 4 Drawing Sheets

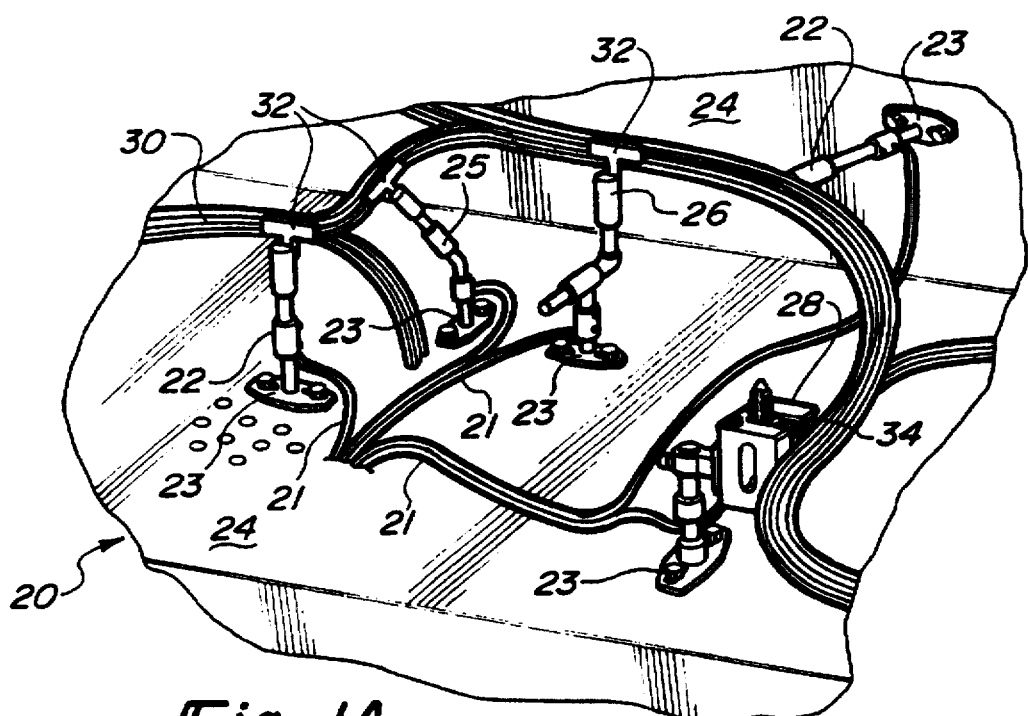
Fig-1A
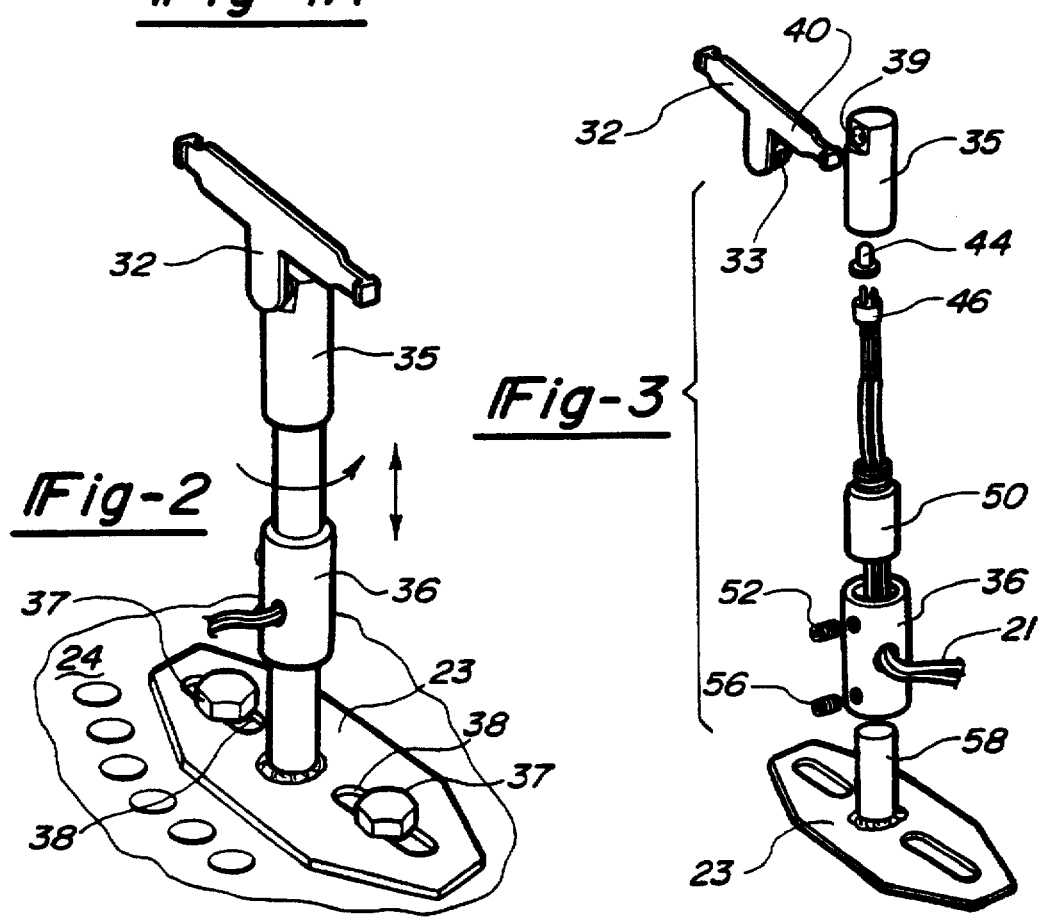
Fig-2
Fig-3

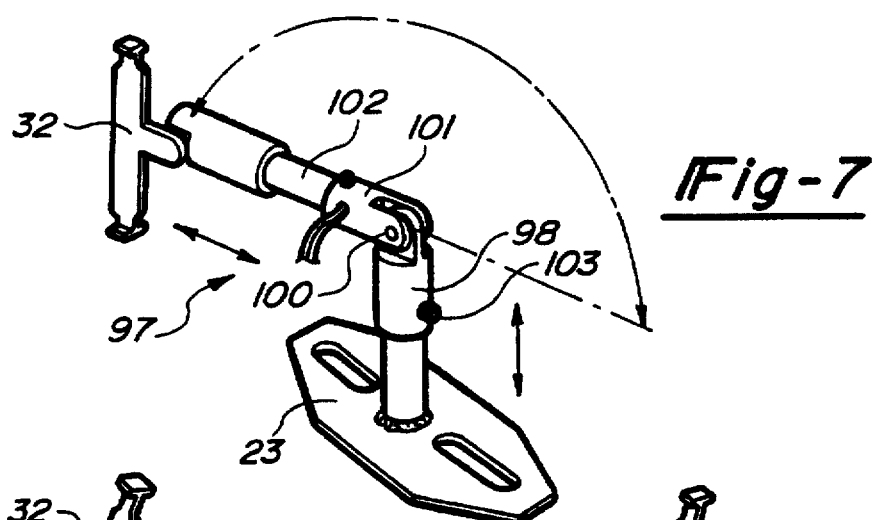
Fig-7
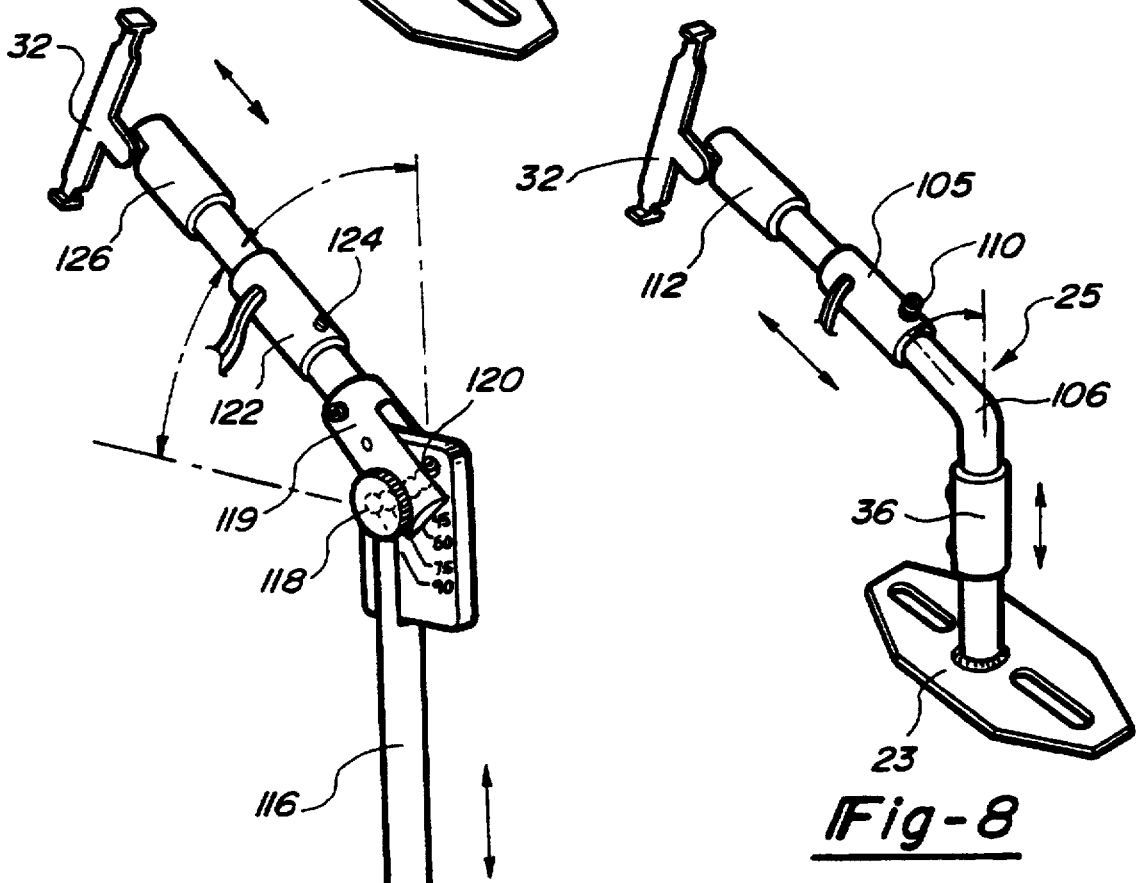
Fig-8
Fig-9

UNIVERSAL WIRE HARNESS RETAINER CLIP HOLDING SYSTEM

This is a divisional of U.S. patent application Ser. No. 08/340,588, filed Nov. 16, 1994 now U.S. Pat. No. 5,535,511.

BACKGROUND OF THE INVENTION

This application relates to a family of wire-harness retainer clip holders that are easily adjusted to accommodate any desired location for holding a retainer clip on a wire harness.

Electrical wires for use on a vehicle are often bundled together into a group typically known as a wire harness. With the increasing electronic applications on a vehicle, the number and complexity of the wire harnesses has increased. Wire harnesses extend within the vehicle bodies and are often attached to the vehicle frame. Thus, wire harnesses often twist to correspond to curves on the vehicle frame.

Retainer clips are attached to the wire harness, and include a plug-like member that is to be inserted into a corresponding opening on the vehicle. The vehicle manufacturers specify the location of the retainer clip to the assembler of the wire harness. Typically, there are many retainer clips that must be mounted onto the wire harness, and the assembly and proper positioning of the retainer clips presents a complex assembly challenge. Since the wire harness may twist along its length, the retainer clips may be necessarily attached at several distinct angular orientations and vertical heights such that they are properly positioned for attachment to the vehicle.

Wire harnesses are typically assembled on a jig, which is essentially a board or a pair of boards extending along two perpendicularly oriented planes, and which contain a pattern of holes. There are many assembly fixtures that must be attached to the jig. Various types of fixtures for holding the individual wires and the harnesses are mounted onto the boards. An example of one such fixture is disclosed in co-pending U.S. patent application, Ser. No. 08/189,377 now U.S. Pat. No. 5,490,664. Typically, retainer clip holders are used to hold the retainer clips at the desired location and orientation for attachment to the wire harness. The surface of the jig often becomes crowded, and it has been difficult in some applications to position a retainer clip holder at a location on the board adjacent to the location where a retainer clip must be mounted to the wire harness.

To address this problem, the prior art has typically constructed fixed retainer clip holders for each individual application. The base of the holder is often at a particular location dictated by available space, and the prior art has constructed fixed holders which extend from the base to a holding portion at the desired position where a retainer clip is to be held. A wire harness assembler may have hundreds of different retainer clip holders having holding portions at various vertical, angular and horizontal locations relative to a base of the holder. For ample, as the harness twists, the vertical height of the clip location changes and the proper orientation of the clip on the harness may also change. When a wire harness assembler is presented with a new wire harness specification, there are so many retainer clip holders of fixed length, height, angular relationship, etc., that the wire harness assembler typically cannot practically select from the hundreds of holders. With the prior art fixed retainer clip holders, almost any new wire harness specification requires the wire harness manufacturer assembler to manufacture a new type of retainer clip holder. This is undesirable, as it further increases inventory, and also increases the difficulty of selecting the proper retainer clip for any individual application.

One known retainer clip holder allowed for a flipping movement of a holder portion relative to the base through two positions spaced by 90 degrees to present retainer clips at two distinct orientations relative to the base of the holder. This retainer clip holder does not overcome the problems discussed above, as it is not adjustable in a horizontal plane or fully adjustable in a vertical plane, nor is its height adjustable. As such, it has not overcome the problems as discussed above.

SUMMARY OF THE INVENTION

The instant invention addresses the above-referenced problem by developing a family of retainer clip holders, each of which can be adjusted to alter the position of a holding portion. A first disclosed holder can be adjusted to position the holding portion angularly in a horizontal plane and about a vertical axis, as well as having its vertical height adjustable relative to a base. This holder provides a wire harness assembler the ability to accommodate many different required retainer positions.

In a second holder within the inventive family of retainer clip holders, the holder portion can be adjusted horizontally, as well as angularly, in a horizontal plane about a vertical axis relative to the base. A third main type of adjustable retainer clip holder has its holder portion at an adjustable angle relative to a vertical axis, as well as angularly, in a horizontal plane about a vertical axis relative to the base. The inventive family includes several types of the angularly adjustable holders to provide several different possible positions. Throughout this application and in the claims, the terms vertical and horizontal are used to describe movement when the holder base is fixed in a horizontally extending plane. Of course, the base could be fixed in a vertically extending plane, and the movement would then be in different planes, but still within the scope of this invention.

In the apparatus according to this invention, a family of retainer clip holders is provided, and appropriate clip holders are selected for each application. Applicant has found that only six distinct types of holders can replace the hundreds of non-adjustable holders required in the past.

In a method according to the present invention, a wire harness is assembled by initially having the desired locations for the retainer clips designed and identified. The shove-discussed family of adjustable retainer clip holders is provided. A selection of the appropriate retainer clip holders is made based upon the desired location for each retainer clip, and further based upon the presence of other retainer clip holders, or other fixtures for assembling the wire harness, that may be adjacent the desired location of the particular retainer clip. The retainer clip holders are adjusted to move the holder portions to the required position relative to the base to achieve the desired position of the retainer clip. The retainer clips are mounted onto the retainer clip holders, and the wire harness is then assembled. The retainer clip holders also electronically confirm the presence of a clip at each location.

The inventive family of retainer clip holders not only reduces the required inventory, thus providing valuable benefits, it also significantly decreases the complexity of assembling a wire harness. In the past, the wire harness assembler needed to study complicated listings of the hundreds of retainer clip holders that were required for any particular assembly operation. Now, since only six basic holders are required, the assembler can more easily tailor the required holders and adjust their positions as required. The inventive family of retainer clip holders thus decreases the required assembly and set-up time, significantly reducing the complexity of assembling a wire harness.

In addition, in the past, separate jigs have been required for each level or type of harness. The inventive family allows a single jig to be tailored for each application.

These and other features of the present invention can be best understood from the following specification and drawings, of which the following is a brief description.

BRIEF DESCRIPTION OF THE DRAWINGS

FIG. 1A is a plan view of a simple wire harness assembly jig.

FIG. 2 shows a first holder according to the present invention.

FIG. 3 is an exploded view of the holder shown in FIG. 2.

FIG. 7 shows a fourth holder according to the present invention.

FIG. 8 shows a fifth holder according to the present invention.

FIG. 9 shows a sixth holder according to the present invention.

DETAILED DESCRIPTION OF A PREFERRED EMBODIMENT

Figure 10:
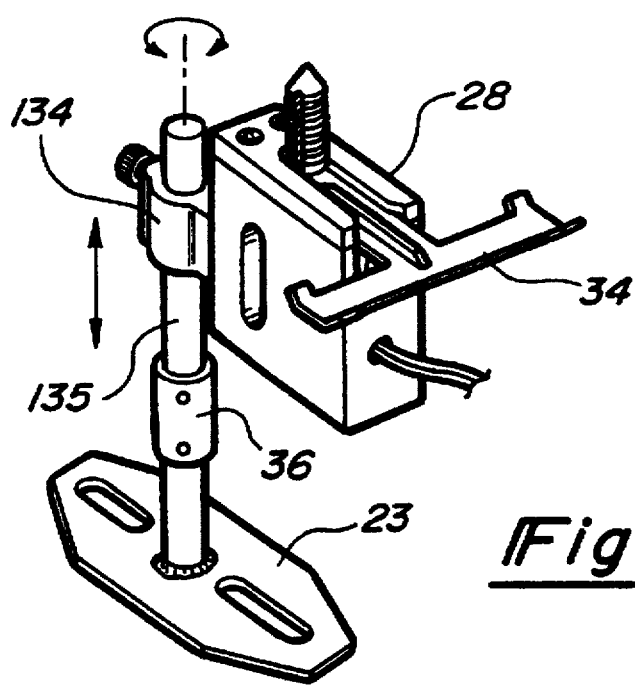
FIG. 10 shows a holder such as is shown in FIG. 2, but mounting an alternative type retainer clip.

FIG. 1A shows a rather simple assembly jig 20 for a wire harness. As shown, a number of signal wires 21 lead from holders such as holder 22. Holder 22 has a base 23 bolted to one of a pair of planar boards 24. Boards 24 have a pattern of openings to receive bolts from base 23. The base 23 can be positioned in many different locations along the planar surface of board 24, dependent on the desired location for a retainer clip, as will be discussed below. It is important to recognize that the view shown in FIG. 1A is a very simplified view of a jig 20. There would typically be many more fixtures mounted on the jig 20 such that space on boards 24 is at a premium. In the past, a wire harness assembler has often been presented with only having a few possible locations or orientations for mounting each base 23. The wire harness assembler has been forced to utilize a particular orientation of the base 23, and then has designed or developed fixed holders which would have a holder portion at a fixed location relative to base 23, such that a retainer clip is at the desired location on the wire harness.

The present invention provides more freedom to an operator by defining a family of retainer clip holders which allow adjustability between the position where the retainer clip is held, and the location where the base 23 is mounted.

As also shown, holder members 25 and 26 are also included within the inventive family. In total, there are preferably six main types of holders within this family. Each of the holders have adjustability between the base and the holder portion. A distinct type of holder portion 28 is also illustrated. FIG. 1A shows retainer clip 34 mounted on the holder portion 28. Although the purpose of the retainer clips 32 and 34 are generally the same, they have slightly different configurations. Holder portions 28 are disclosed generally in copending U.S. patent application Ser. No. 08/228,339 now abandoned. Throughout this Application, it should be understood that holder portion 28 is easily substituted for the holder portions which are illustrated in the figures. Essentially, the holder portion at the top of the holders 22, 25 and 26 may be easily removed and a portion similar to portion 28 replaced on each of the individual and adjustable holders of this invention.

The purpose of the holders as illustrated in FIG. 1A is to ensure the proper assembly of retainer clips on a wire harness 30. The holders each hold a retainer clip 32 at locations on wire harness 30 demanded by the specifications of the wire harness designers. When a wire harness assembler is faced with a specification identifying the location for a retainer clip 32, the wire harness assembler must determine how to position a retainer clip holder on boards 24, such that the retainer clip 32 will be positioned relative to the wire harness 30 at the proper vertical, horizontal and angular orientations. While this may at first blush appear as a relatively simple task, in practice the jig 20 is very crowded with numerous types of fixtures holding the wire harness 30, or holding other retainer clips. As such, the wire harness assembler is often limited in the available positions for base 23 on the board 24. Also, as the wire harness twists, its vertical height changes, and the necessary orientation of the clip on the wire harness may also change. The inventive adjustable holder members of this invention provide valuable benefits for a wire harness assembler by allowing adjustment of the holder portion.

Figure 1B:
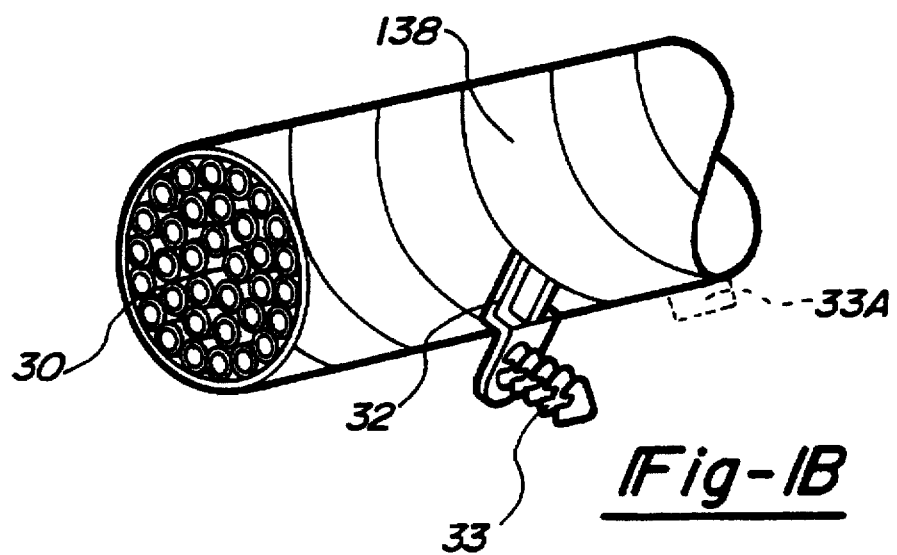
FIG. 1B is a view showing the mounting of a retainer clip to a wire harness.

FIG. 1B shows a retainer clip mounted upon wire harness 30. Retainer clip 32 includes a plug 33 that is to be received in an opening in a vehicle. The plug 33 dictates the proper orientation and location of the retainer 32 such that the plug will be in a proper location for being inserted within an opening on the vehicle as the wire harness 30 is installed on the vehicle. As shown, a tape wrap 138 is typically wrapped around the retainer clip 32 to hold it to the wire harness 30. An alternative orientation 33A for the plug is also shown in phantom. Such alternative orientations required new fixed holders in the prior art, but are easily addressed with the inventive holder family.

As shown in FIG. 2, a first holder 22 incorporates a holder portion 35 holding the retainer clip 32. The holder 22 includes a vertical height adjustable bushing 36 such that the vertical distance between the retainer clip 32 and the base 23 may be easily adjusted as required. Moreover, the vertically adjustable bushing 36 also allows the angular orientation of the holder portion 35 relative to the base to be adjusted in a horizontal plane about a vertical axis. Thus, the wire harness assembler may adjust the position of retainer 32 both about a vertical axis, and may also adjust the vertical height of holder portion 35.

As further shown in FIG. 2, bolts 37 pass through slots 38 and into the holes on the board 24 to secure base 23 to the board 24. The slots 38 and the array of holes allow the orientation of base 23 on board 24 to be changed to insure that two holes in board 24 for receiving bolts 37 can be identified. As will be described below, this invention includes the step of identifying the best available orientation for base 23 available on board 24 in the location of a particular desired retainer clip location. The wire harness assembler then selects which of the several inventive adjustable retainer clip holders would be best suited for positioning the retainer clip 32 at the desired location, given the best available position of base 23 on board 24. While the use of two belts 37 and slots 38 provide a good connection to board 24, it also requires a relatively wide space for base 23. This further complicates the positioning of a holder. The inventive family easily overcomes this complication.

As shown in FIG. 3, retainer clip 32 includes an arm portion 40 which is the portion taped to wire harness 30. Holder portion 35 incorporates an opening 39, which receives the plug 33 as the wire harness is being assembled. Within holder portion 35, a plunger 44 is pushed downwardly when the plug 33 is received in opening 39. Plunger 44 then completes an electrical contact 46 to send a signal through signal wires 21 that a retainer clip is received within the holder portion 35. The other inventive holders include similar circuitry. Signal wires 21 allow an assembler to insure that all retainer clips are properly mounted on the wire harness 30. As described above, holder portions 28 and clips 34 may alternately be used.

In the prior art, there was no adjustability in the angular orientation of opening 39 relative to base 23. As will be described, the inventive holders do allow such adjustability.

The vertically adjustable bushing 36 receives an upper member 50 which is preferably threadedly attached to holder portion 35. The vertically adjustable bushing 36 includes a set screw 52 that locks upper member 50 at a desired telescopic and angular position within bushing 36. Similarly, a set screw 56 locks bushing 36 relative to a post 58 extending upwardly from base 23. By properly telescopically adjusting portions 50, 36 and 58, a variety of desired vertical positions for the retainer clip 32 relative to base 23 can be achieved. Moreover, bushing 36 is also angularly adjustable is a horizontal plane about the vertical axis of post 58; that is, it can turn about 360 degrees on post 58. Thus, an operator may easily tailor the position of retainer clip 32 relative to base 23 by adjusting the angular orientation of the opening 39 relative to the base 23, and also adjusting the vertical height. Also, since signal wires 21 pass outwardly of bushing 36, the direction of the wires 21 can also be adjusted.

Figure 4:
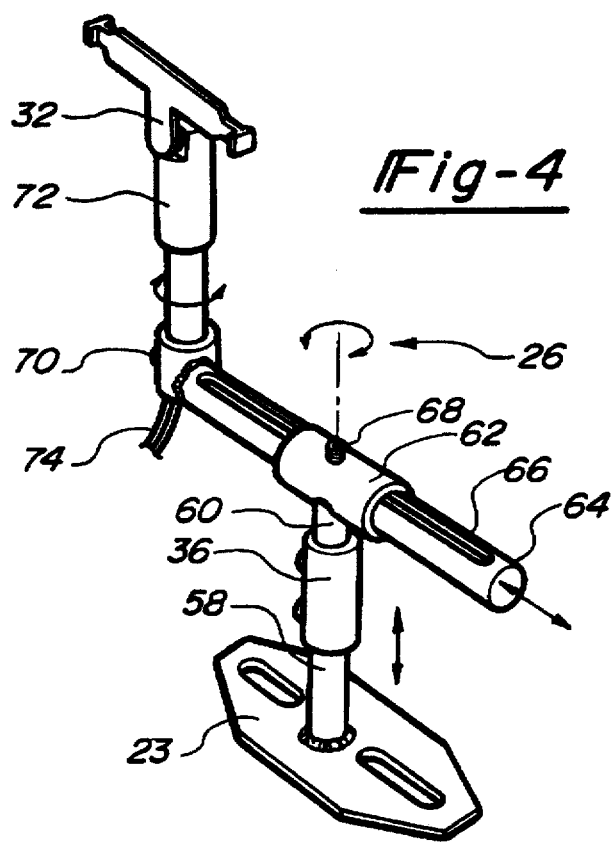
FIG. 4 shows a second holder according to the present invention.

A second type of holder 26 is illustrated in FIG. 4. In holder 26, a similar vertical and angular adjustability about a post 58 is provided by bushing 36. In holder 26, a post 60 extends upwardly from vertically adjustable bushing 36 to a tube 62. An arm 64 extends through robe 62, and includes a slot 66. A set screw 68 extends downwardly through tube 62 and into slot 66 to lock arm 64 in robe 62 at any desired axial location. A second bushing 70 receives holder portion 72, and allows angular adjustment about a vertical axis of holder portion 72 relative to bushing 70. Thus, with holder 26, an operator may adjust the horizontal position of the retainer clip relative to the base; the operator may adjust the angular orientation of the retainer clip 32 in a horizontal plane and about a vertical axis, both at bushing 36 and bushing 70; and the operator my adjust the vertical position of holder 32 relative to base 33. This holder is particularly useful if the base must be mounted some horizontal distance from the wire harness.

Figure 5:
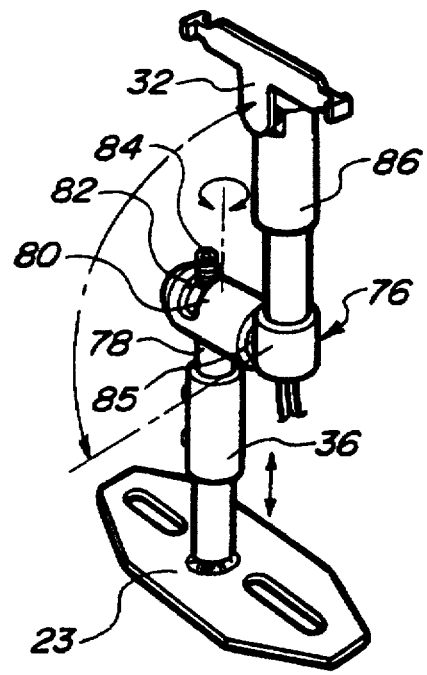
FIG. 5 shows a third holder according to the present invention.

As shown in FIG. 5, yet another holder 76 allows movement of retainer clip 32 through a 90 degree angle. In holder 76, a post 78 is received in vertically adjustable bushing 36. Post 78 is fixed to a tube 80 having a slot 82. A pin 84 is fixed to an arm 85 which carries holder portion 86. By moving holder portion 86 and pin 84 through slot 82, the position of retainer clip 32 relative to base 23 can be changed between two positions spaced by 90 degrees in a plane extending through a vertical axis.

Figure 6:
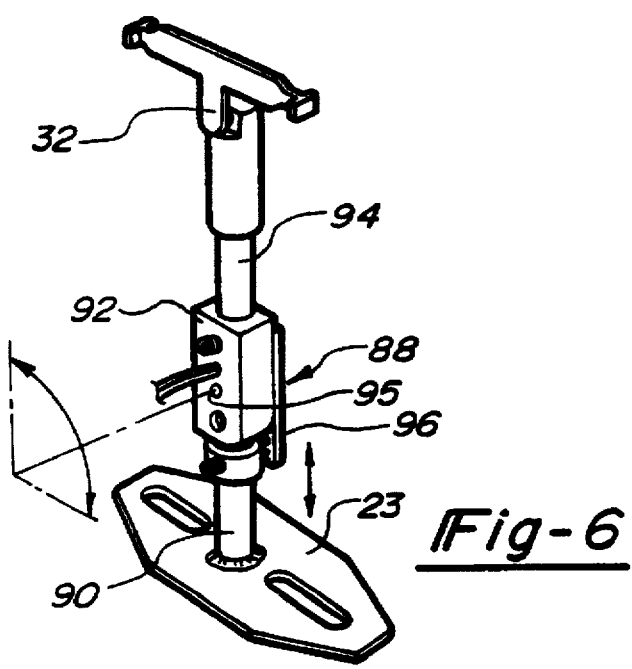
FIG. 6 shows an alternative to the holder shown in FIG. 5.

FIG. 6 is a simplified holder 88 for performing a function similar to the holder shown in FIG. 5. In holder 88, a post 90 receives a member 92 that can position a holder portion 94 which extends generally vertically upwardly. A pivot joint 95 allows pivoting movement of member 92, and consequently holder portion 94 relative to a plate 96. The pivoting movement provides adjustment of the location of retainer clip 32 between two positions spaced by a 90-degree angle relative to base 23.

In both holders 76 and 88, a spring biased ball is selectively forced into one of two detents to define the two positions. Such detent structure is generally known.

The holder 88 has a slimmer profile than holder 76 and is thus more space efficient on a crowded jig. While a preferred family of holders would include both, only one of the two types may also be provided. Thus, while this application discloses six main types of holders, there are seven disclosed.

Holder 97 illustrated in FIG. 7, includes a bearing 98 pivotally connected 100 to a bushing 101 holding holder portion 102. Pivot 100 allows the location of retainer clip 32 to be adjusted through 180 degrees relative to base 23. Bushing 98 is secured by a set screw 103 allowing adjustment of the vertical height and also rotation of the holder portion 102 about a vertical axis relative to base 23. Bushing 101 allows the angular adjustment of holder portion 102 about an axis of bushing 101 and also allows telescopic adjustment of the horizontal extension of holder portion 102 from pivot connection 100 and thus base 23.

As shown in FIG. 8, holder 104 incorporates an arm 106 defined at a 45 degree angle relative to the vertical. An adjustable bushing 108 is secured to arm 106 by a set screw 110. Holder portion 112 moves with bushing 108. By using holder 104, an operator can position a retainer clip at a 45 degree angle relative to the vertical, and can adjust the extension of the retainer clip 32 relative to the base 23 through bushing 108. At the same time, vertical adjustability and adjustability about the vertical axis are provided by adjustable bushing 36. Also, bushing 108 allows the angular adjustment of holder portion 112 about an axis of arm 106.

FIG. 9 shows holder 114 including an extention member 116 extending from vertical adjustable bushing 36. A removable pin 118 is selectively attached to a pivoting member 119. Pin 118 is inserted through pivoting member 119 and into one of a plurality of slots 120. This locks pivoting member 119 at a desired angular location. As shown, slots 120 are associated with several desired angles. A bushing 122 receives a set screw 124 such that the extention of holder portion 126 relative to base can be adjusted. Also, the angular orientation of holder portion 126 relative to an axis of bushing 122 can also be adjusted. With holder 114, the angular orientation of retainer clip 32 relative to base 23 in a vertical plane can be adjusted, as can the vertical position, the extension, and the angular orientation in a horizontal plane relative to the vertical axis.

FIG. 10 shows a detail of a holder 129 incorporating the second type of retainer clip holder portion 28 mounted on the first holder 22. As shown, the retainer clip 34 received in holder portion 28 is slightly different than the other retainer clips 32, as described above. A mount 134 hold the holder portion 28 on a post 135. The combined post and mount 134 can be substituted for any of the holder portions described in the above-referenced embodiment. The operator must merely select which type of retainer clip is being utilized, and mount the appropriate holder portion on the appropriate holder as described in the above embodiments.

The inventive family of retainer clip holders provide a wire harness assembler with a high degree of freedom and flexibility in selecting the appropriate holder for the particular application. In a method according to this invention, the wire harness assembler studies the desired positions for the retainer clips, and identify the necessary locations for other fixtures that must be mounted on the jig 20. The wire harness assembler then determines the location of holes on board 24 to receive bolts from the base 23 that are available in the adjacent area for each of the retainer clips 32 or 34. The assembler then knows the required orientation of base 23. The wire harness assembler then determines which of the several adjustable retainer clip holders described above is best suited for achieving the particular desired retainer clip location, given the mount space available in the vicinity of the location for the retainer clip 42. Once the desired holders are selected they are adjusted as required. The holders are then connected to board 24 with base 23 in the required orientation and the retainer clips are mounted to the wire harness. The signal wires 21 are used to provide a signal confirming the presence of each clip. In this way, a wire harness is assembled which insures that the retainer clips are easily and properly positioned on the wire harness 30.

In sum, the inventive family of retainer clip holders decreases the required inventory of retainer clip holders. In addition, the assembler will not have to design and manufacture new retainer clip holders to meet new required relative positions between the holder portions and the base. The overall setup and assembly time for the assembly of wire harnesses has been significantly reduced by this invention, and this inventive family of retainer clip holders provides many valuable benefits.

Although a preferred embodiment of this invention has been disclosed, it should be understood that certain modifications would come within the scope of this invention. For that reason, the following claims should be studied in order to determine the true scope and content of this invention.

I claim:

1. A family of retainer clip holders for assembly of retainer clips on a wire harness comprising:

at least three holders, each of said three holders incorporating a retainer clip holder portion, a frame for mounting said retainer clip holder portion at a desired location, a base for mounting said frame on a jig for assembly of a wire harness, and said frame incorporating circuitry to provide a signal indicating the presence of a retainer clip in said retainer clip holder portion;

1) a first holder having moving parts allowing selective adjustment of the vertical height of said retainer clip holder portion relative to said base, and also the adjustment of the angular orientation of said retainer clip holder portion in a horizontal plane about a vertical axis relative to said base;

2) a second holder having moving parts allowing adjustment of the horizontal position of said retainer clip holder portion relative to said base, and also the adjustment of the angular orientation of said retainer clip holder portion in a horizontal plane about a vertical axis relative to said base;

3) a third holder having moving parts allowing the adjustment of the angular orientation of said retainer clip holder portion in a vertical plane relative to said base; and said first, second and third holders being utilized together to construct a wire harness.

2. The family of holders as recited in claim 1, wherein each said base has two openings for passage of members for holding each of said first, second and third holders on the jig.

3. The family of holders as recited in claim 1 wherein said second holder moving parts include a tube and an arm extending through said tube, the position of said arm within said tube being adjustable to adjust the horizontal position of said second holder retainer clip holder portion relative to said base.

4. The family of holders as recited in claim 3, wherein said arm includes a post that receives said second holder retainer clip holder portion, and said second holder retainer clip holder portion is adjustable in a horizontal plane about a vertical axis relative to said arm.

5. The family of holders as recited in claim 1, wherein said second holder moving parts further allowing said second holder retainer clip holder portion to be angularly adjustable in a horizontal plane about a vertical axis relative to said arm.

6. The family of holders as recited in claim 1, wherein said second and third holders are also adjustable such that the vertical height of said second and third holder retainer clip holder portions are adjustable relative to said base.

7. The family of holders as recited in claim 6, wherein said vertical height adjustability is provided by a telescopic bushing connection between said second and third holder retainer clip holder portions and said base.

8. The family of holders as recited in claim 7, wherein the angular orientation of said bushing and said retainer clip holder portion is also adjustable, and signal wires from said circuitry extend outwardly of said frame through said bushing.

9. The family of holders as recited in claim 1, wherein said third holder moving parts are also adjustable such that the position of said retainer clip holder parts in the horizontal plane relative to said base is also adjustable.

10. The family of holders as recited in claim 9, wherein said third holder moving parts are also adjustable about an axis of said third holder retainer clip holder portion.

11. The family of holders as recited in claim 10, wherein a telescopic bushing secures said retainer clip holder portion to said frame to provide the extension adjustment and the adjustability about the axis of said third holder retainer clip holder portion.

12. The family of holders as recited in claim 9, wherein said third holder is adjustable to select any one of several angles to position said third holder retainer clip holder portion relative to said base.

* * * * *